US012361657B2

(12) United States Patent
Madden

(10) Patent No.: US 12,361,657 B2
(45) Date of Patent: Jul. 15, 2025

(54) PHYSICAL OBJECT INTEGRATION WITH EXTENDED REALITY ENVIRONMENTS

(71) Applicant: ObjectVideo Labs, LLC, Tysons, VA (US)

(72) Inventor: Donald Gerard Madden, Columbia, MD (US)

(73) Assignee: ObjectVideo Labs, LLC, Tysons, VA (US)

( * ) Notice: Subject to any disclaimer, the term of this patent is extended or adjusted under 35 U.S.C. 154(b) by 42 days.

(21) Appl. No.: 17/946,562

(22) Filed: Sep. 16, 2022

(65) Prior Publication Data

US 2023/0092395 A1 Mar. 23, 2023

Related U.S. Application Data

(60) Provisional application No. 63/246,569, filed on Sep. 21, 2021.

(51) Int. Cl.
*G06T 19/20* (2011.01)
*G06T 19/00* (2011.01)

(52) U.S. Cl.
CPC .......... *G06T 19/20* (2013.01); *G06T 19/006* (2013.01)

(58) Field of Classification Search
CPC ....... G06T 19/20; G06T 19/006; G06V 20/20; G06F 3/011
See application file for complete search history.

(56) References Cited

U.S. PATENT DOCUMENTS

| | | |
|---|---|---|
| 6,257,085 B1 | 7/2001 | Bokamper et al. |
| 10,022,873 B2 | 7/2018 | Larrea-Tamayo et al. |
| 10,378,200 B2 | 8/2019 | Larrea-Tamayo et al. |
| 10,502,295 B2 | 12/2019 | Kollreider |
| 11,263,475 B2 * | 3/2022 | Krishnamoorthi ... G06V 10/772 |
| 11,305,416 B1 | 4/2022 | Correnti et al. |

(Continued)

OTHER PUBLICATIONS

Di Gironimo, Giuseppe, et al. "A virtual reality approach for usability assessment: case study on a wheelchair-mounted robot manipulator." Engineering with Computers 29 (2013): 359-373. (Year: 2013).*

(Continued)

*Primary Examiner* — Ryan M Gray
(74) *Attorney, Agent, or Firm* — Fish & Richardson P.C.

(57) ABSTRACT

Methods, systems, and apparatus, including computer programs encoded on computer storage media, for motorized structure integration with augmented and virtual reality. One of the methods includes determining one or more physical objects for use with an extended reality environment; generating, for a physical object from the one or more physical objects, data for a representation of the physical object for use in the extended reality environment; providing, to a user device, at least some of the data for the representation of the physical object to cause the user device to present at least a portion of the representation in the extended reality environment; determining to change a presentation of the representation in the extended reality environment; and in response to determining to change the presentation of the representation, controlling a physical position of the physical object using the change to the presentation of the representation in the extended reality environment.

20 Claims, 4 Drawing Sheets

(56) References Cited

U.S. PATENT DOCUMENTS

| | | |
|---|---|---|
| 2010/0327717 A1 | 12/2010 | Huber et al. |
| 2011/0062842 A1 | 3/2011 | Huber et al. |
| 2019/0041988 A1* | 2/2019 | Pohl ........................ G06F 3/011 |
| 2019/0217198 A1* | 7/2019 | Clark ...................... H04S 7/303 |
| 2023/0226692 A1* | 7/2023 | Hou ...................... B25J 9/1653 |
| | | 700/245 |

OTHER PUBLICATIONS

NPL Video Titled: "Programming an Industrial Robot using the Oculus Rift", available for viewing at: https://www.youtube.com/watch?v=uyGJ7gd7jq8; published Mar. 6, 2014; select screenshots included. (Year: 2014).*

* cited by examiner

PHYSICAL OBJECT INTEGRATION WITH EXTENDED REALITY ENVIRONMENTS

CROSS-REFERENCE TO RELATED APPLICATION

This application claims the benefit of U.S. Provisional Application No. 63/246,569, filed Sep. 21, 2021, and titled "Motorized Structure Integration with Augmented and Virtual Reality," which is incorporated by reference.

TECHNICAL FIELD

This specification relates generally to motorized structures and augmented and virtual reality computer systems.

BACKGROUND

Augmented reality (AR) is an interactive experience of a real-world environment where the objects that reside in the real world are augmented by computer-generated perceptual information, sometimes across multiple sensory modalities, such as visual, auditory, haptic, somatosensory, and olfactory.

Virtual reality (VR) is a simulated experience that can be similar to or completely different from the real world. Applications of virtual reality include entertainment (e.g. video games), education (e.g. medical or military training), and business (e.g. virtual meetings).

Virtual and augmented reality can be referred to generally as extended reality (XR).

SUMMARY

Systems and methods for mobilized device integration with extended reality (XR) systems are disclosed. The proposed techniques use motorized structures, e.g., robotic mobile devices, to support XR environments including augmented reality (AR) and virtual reality (VR) environments.

Extended reality provides an enhanced or alternate version of reality where a view of physical real-world environments as seen through a computing device is augmented with superimposed, computer-generated images, thus enhancing the user's view, or replaced with computer-generated images. The computing device can provide a computer-generated simulation of a three-dimensional image or environment that can be interacted with in a seemingly real or physical way by a person using special electronic equipment, such as a helmet with a screen inside or gloves fitted with sensors. In the case of augmented reality, graphics, sounds, and touch feedback can be added into the view on the computing device to create an enhanced user experience.

The disclosed techniques can be used to dynamically manifest virtual structures in the real world. An XR space is typically an empty space where the user can freely move about without tripping over hazards or bumping into things in the real world. The XR space can be a play space, e.g., for games, a workspace, or any other appropriate type of space. XR applications often model environments that include furniture, platforms to stand on, handrails, etc., with which a user can interact. These virtual structures can be represented in the real world using motorized structures. Motorized structures can enable users to reconfigure the structures within a space with little physical effort. The motorized structures may include various motors that can perform a variety of actions. For example, a chair may have motorized wheels that are capable of moving the chair around a space, a motorized seat that is capable of raising or lowering height, a motorized seatback that is capable of retracting, extending, or tilting, motorized arms that are capable of raising and lowering height, etc.

The motorized structures can move into an XR space when needed to support an XR environment, as instructed by a computing system that is running an XR application. Upon completion of an assigned task, the motorized structures can return to a preset location outside the space, using XR system tracking to accurately localize and avoid users and other obstacles. The motorized structures can be stable and sturdy enough to support weight and to remain in position when forces are applied to them. The motorized structures can be configurable to change shapes and sizes as instructed by an XR system to support various XR environments.

Using motorized structures to support XR environments can improve realism of the XR environments. For example, a user in an XR space with can perform actions in the XR environment that are enhanced by real-world representation. Virtual actions that can be supported can include, for example, sitting on a park bench, leaning over a railing of a ship, performing a step exercise routine, etc. Motorized structures can also improve accessibility by providing dynamic handrails or other accommodations in the real world that correspond to objects in the XR environment.

In general, one aspect of the subject matter described in this specification can be embodied in methods that include the actions of determining one or more physical objects for use with an extended reality environment; generating, for a physical object from the one or more physical objects, data for a representation of the physical object for use in the extended reality environment; providing, to a user device, at least some of the data for the representation of the physical object to cause the user device to present at least a portion of the representation in the extended reality environment; determining to change a presentation of the representation in the extended reality environment; and in response to determining to change the presentation of the representation, controlling a physical position of the physical object using the change to the presentation of the representation in the extended reality environment.

Other implementations of this aspect include corresponding computer systems, apparatus, computer program products, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination. In some implementations, generating the data for the representation of the physical object for use in the extend reality environment can use second data representing the one or more physical objects. The method can include generating the extended reality environment that includes the representation of the physical object.

In some implementations, determining the one or more physical objects can include determining that a motorized object is available for representing objects in the extended reality environment. The method can include sending, to the motorized object, instructions to cause the motorized object to move to a physical location that corresponds to a virtual location of the representation in the extended reality environment.

In some implementations, generating the data for the representation can include generating a first representation i) of a first physical object from the one or more physical objects ii) that has the same type as the first physical object. Generating the data for the representation can include generating a first representation i) of a first physical object from the one or more physical objects ii) that has a different type than the first physical object.

In some implementations, determining to change the presentation of the representation can include receiving, through the user device, data indicating a user-input adjustment to the representation in the extended reality environment. The method can include changing the presentation of the representation in the extended reality environment substantially concurrently with controlling the physical position of the physical object that corresponds to the representation.

The subject matter described in this specification can be implemented in various implementations and may result in one or more of the following advantages. In some implementations, the systems and methods described in this specification can improve an accuracy of an XR environment, e.g., by using real world physical objects, improve user interaction with an XR environment, e.g., by moving real world physical objects represented in an XR environment, or a combination of both.

In some implementations, the systems and methods described in this specification can provide improved accessibility. For instance, the system can enable users who may struggle to stand unaided for long periods of time to have places to sit, railings to hold onto, or a combination of both, in a virtual environment. The use of a place to sit, a railing to hold onto, or both, can dynamically adjust to the virtual environment experience, move with the user, or both. For example, the place to sit or railing can move so that there is always a railing nearby or a place to sit down right behind them, whether or not that's a part of the virtual environment.

In some implementations, the systems and methods described in this specification can provide an improved, e.g., richer or more accurate, experience in a smaller space by reconfiguring objects dynamically to fit a virtual environment experience and then move out of the way when appropriate. For instance, the system can maximize the space available for movement while still having affordances like seats and steps that might otherwise require dedicated spaces for each. In some examples, the objects can be part of the normal room furnishings. The system can reconfigure the objects automatically to provide space for the virtual environment and then go back to the original configuration afterwards, allowing better use of limited space.

The details of one or more implementations of the subject matter described in this specification are set forth in the accompanying drawings and the description below. Other features, aspects, and advantages of the subject matter will become apparent from the description and the drawings.

BRIEF DESCRIPTION OF THE DRAWINGS

Like reference numbers and designations in the various drawings indicate like elements.

DETAILED DESCRIPTION

Figure 1:
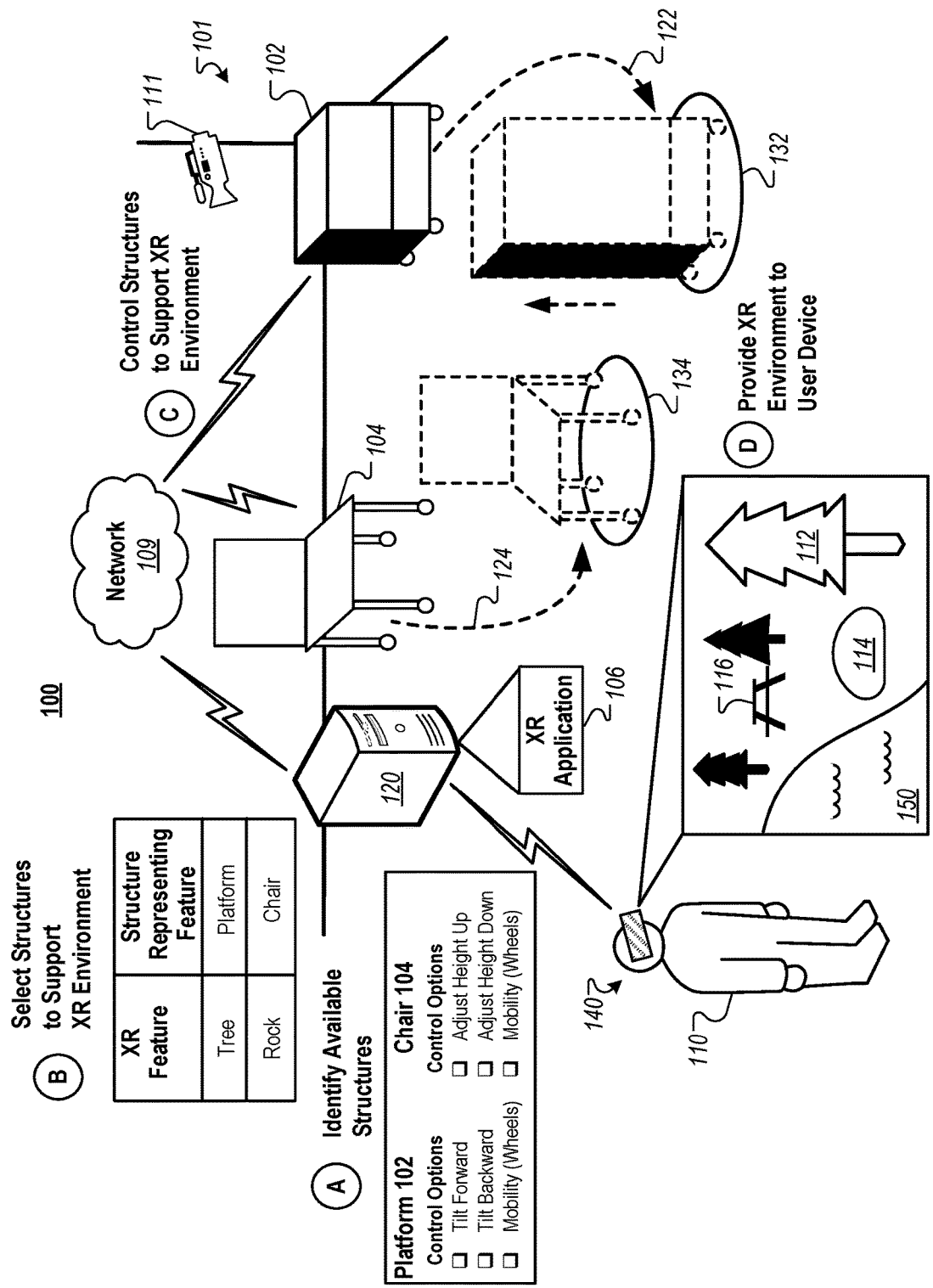
FIG. 1 is a diagram illustrating an example of a motorized structure control system that controls motorized structures to support environments of an XR system.

FIG. 1 is a diagram illustrating an example of a motorized structure control system 100 that utilizes motorized structures to support virtual and augmented (XR) environments of an XR system. In FIG. 1, a space 101 is equipped with the motorized structure control system 100 that includes various motorized structures, e.g., platform 102 and chair 104. The system 100 also includes a network 109, a server 120, and an XR device 140. The server 120 runs an XR application 106. XR environments generated by the XR application 106 are provided to the XR device 140 for presentation to a user 110.

In the example of FIG. 1, the XR system includes the XR device 140 and the server 120. The XR device 140 includes a headset worn by the user 110. The XR system can also include one or more controllers and/or trackers that are worn by or carried by the user 110.

In some examples, an XR system can include a wearable computing system that performs the functions that are described herein as being performed by the server 120. For example, the computing system can be integrated with the headset, e.g., as part of the same physical device as the headset. In some examples, the XR system includes a headset and a separate wearable computing system that performs the functions of the server 120. For example, the XR system can include a wearable computing system that is integrated with a backpack, vest, harness, etc.

In some examples, an XR system can include a computing system that is wired or wirelessly communicable with the headset and performs the functions that are described herein as being performed by the server 120. For example, the XR system can include a mobile computing device such as a smart phone, table, laptop, or other mobile computing device. The mobile computing device can run an XR application 106 and transmit images of the XR environments for display on the headset.

In some examples, an XR system can include more than one display. For example, the XR system can include more than one headset, and the server 120 can provide XR environments for display on each of the one or more headsets. In some examples, the XR system can include one or more display screens such as a television screen or computer screen, and the server 120 can provide XR environments for display on the one or more display screens.

The server 120 may be located within or outside of the space 101. The server 120 is in communication with the XR device 140. The server 120 may be, for instance, one or more computer systems, server systems, or other computing devices. In some examples, the server 120 may be a cloud computing platform or a game console. The server 120 can store a model of the space 101. For example, the server 120 can store data indicating boundaries of the space. Boundaries of the space can be physical boundaries, e.g., walls, or can be virtual boundaries input by the user 110.

The space 101 can be any space in which a user 110 uses an XR system. For example, the space 101 can be a room of a building or an outdoor area. The space 101 can be a mostly empty space where the user 110 can freely move about without tripping over hazards or bumping into objects in the real world.

Components of the system 100 can communicate through a network 109. The network 109 may be any communication infrastructure that supports the electronic exchange of data between the device sand the sensors. The network 109 may include a local area network (LAN), a wide area network (WAN), the Internet, or other network topology. The network 105 may be any one or combination of wireless or wired networks and may include any one or more of Ethernet, cellular telephony, Bluetooth, and Wi-Fi technologies. Communications through the network 109 may be implemented through any one or combination of various protocols, including the 802.11 family of protocols, Bluetooth, Bluetooth LE, Z-Wave, ZigBee, GSM, 3G, 4G, 5G, LTE, or other custom or standard communication protocol. In some examples, the network 105 may include optical data links. To support communications through the network 109, the components, e.g., the XR device 140, the server 120, and the motorized structure, may include communications modules, such as a modem, transceiver, modulator, or other hardware or software configured to enable the device to communicate electronic data through the network 105.

The server 120 tracks the location and movement of the motorized structures. For example, the server 120 tracks the location and movement of the platform 102 and the chair 104 throughout the space 101. In some examples, the server 120 can track motorized structures using inside-out tracking based on sensors installed on the motorized structures. For example, the platform 102 and the chair 104 may have embedded sensors, e.g., inertial measurement units, accelerometers, gyroscopes, electromagnetic sensors, etc. The server 120 can use sensor data generated by the sensors to determine location, speed, and direction of motion of the motorized structures. The sensors can provide sensor data to the server 120 through the network. Based on the sensor data, the server 120 can track movement of the components.

In some examples, the server 120 can track location and movement of the motorized structures using a combination of inside-out and outside-in tracking. For example, when the motorized structures are within a field of view of an external camera, e.g., the camera 111 or a camera of the XR device 140, the server 120 can track the motorized structures using camera image data. When the motorized structures are not within the field of view of an external camera, the server 120 can track the motorized structures using sensors embedded on the motorized structures.

In some examples, the server 120 can track components of the system 100 using outside-in tracking based on sensors that are external to the components. For example, a camera 111 may be installed in or near the space 101. The server 120 can obtain camera image data from the camera 111 and use the camera image data to track locations and movement of the motorized structures. In some examples, the XR device 140 can include one or more embedded cameras. The server 120 can obtain image data from the embedded cameras and use the image data to track locations and movement of the motorized structures. In some examples, cameras on XR device 140 can be used for simultaneous localization and mapping, where a three-dimensional (3D) map of the environment is generated in real time. The server 120 can use machine learning algorithms to determine where the XR device 140 is positioned within that 3D map, using feature detection to reconstruct and analyze surroundings.

The server 120 can run an augmented reality or virtual reality application such as a game. The server 120 can generate an XR environment for presentation to the user 140 as an XR image displayed through the XR device 140. An XR image can be an AR image that augments a view of a real-world environment or a VR image that replaces some or all of a view of a real-world environment. The XR image can be displayed on a wide variety of displays, or directly into the user's eyes, usually through glasses or a headset. Other XR devices include smartphones and tablets. The user 110 can hold these types of devices in their hands and view the display of the smartphone or tablet.

In some examples, the XR device 140 processes image data collected by embedded cameras, determines the locations of the objects within the space 101, and augments the images of the objects. Multiple cameras may be built in the XR device 140, to perform depth sensing, picture recording, video recording, augmentation processing, etc. The XR device 140 may include a screen to augment image data captured by the camera of the device such that the image becomes an interactive environment. The XR device 140 may require significant edge computer processing power and includes many components like a CPU, a GPU, memory, GPS chip, etc.

The motorized structures can be located in or near the space 101 in order to support XR environments presented to the user 110 through the XR device 140. The motorized structures can be maneuverable about the space 101. For example, the motorized structures can include wheels, legs, skis, stair-climbers, treads, and/or other components that permit the motorized structures to move. The motorized structures can include motors, e.g., electric motors. The motors can be battery powered and/or rechargeable.

In some implementations, motorized structures can move on tracks and/or using motorized treads. In some implementations, the motors used to move the structures are not located on the structures itself (e.g., located within a track, located in a ceiling, etc.). In some implementations, the structures contain motors that produce different actions, such as closing and/or opening doors or drawers of the structures. The motorized structures may communicate with each other and with other components of the system 100 through the network 109.

In some examples, the motorized structures can be located at assigned locations when not in use. For example, the user 110 can reserve a clear area that is trackable by the XR device 140, but is excluded from the space 101. This is where one or more motorized structures can move to when not actively in use. In some cases, there might be multiple such "parking spaces" to enable one or more motorized structures to deploy from different ends of the space 101, etc. The motorized structures may have charging facilities in these locations.

In some examples, when the motorized structures are not in use by an XR application 106, the motorized structures can be parked in locations where the motorized structure can be used for other purposes. For example, the platform 102 may have dimensions and material properties suitable for use as an ottoman. Thus, when not in use by an XR application 106, the platform 102 may be parked in a location near a couch, so that the platform 102 can be used as an ottoman.

Each motorized structure can be tracked by the XR system with the same accuracy as other components such as the headset, controllers, etc. In some examples, the XR system can control movement of the motorized structures around the space 101 while tracking the location, speed, and direction of movement of the motorized structures.

The motorized structures include the platform 102 and the chair 104. In some examples, the motorized structures might not include sensors. For example, the motorized structures can be remotely controlled by the server 120 without having autonomous capabilities. In some examples, the server 120 can drive the motorized structures using a closed-loop control system. The server 120 can control the motorized structures to move them within the space 101 and to position the motorized structures at a particular position and orientation. Using precise control and tracking, the server 120 can render the motorized structures or similarly shaped objects in the XR environment space at a position that corresponds to the location of the motorized structures in the space 101.

In some examples, the motorized structures can include onboard sensors and/or processing capabilities. The sensors and processing capabilities can enable the motorized structures to perform autonomous navigation around the space 101. For example, the motorized structures can have abilities to perform dead-reckoning, obstacle avoidance, and cliff avoidance. In some examples, the motorized structures can include sensors such as pressure sensors and tip sensors. Embedded sensors and processing can enable the motorized structures to function properly through losses in tracking, for example, in a case where the network 109 fails and the server 120 loses tracking and/or control of the motorized structures. The autonomous capabilities of the motorized devices can serve as a fail-safe if the server 120 provides instructions that put the motorized structures into hazardous situations.

In some examples, the server 120 can provide the motorized structures with instructions for default behavior. The motorized structures can perform the default behavior in the absence of other instructions. For example, the motorized structures can perform the default behavior in an event in which communication is lost between the motorized structures and the server 120. In some examples, the default behavior can include remaining stationary. In some examples, the default behavior can include returning to an assigned parking space in or near the space 101.

FIG. 1 illustrates a flow of events, shown as stages (A) to (D), with each representing a step in an example process. Stages (A) to (D) may occur in the illustrated sequence, or in a sequence that is different from the illustrated sequence. For example, some of the stages may occur concurrently.

In stage (A), the server 120 identifies available structures. For example, the server 120 identifies the platform 102 and the chair 104 as available structures in the space 101. In some examples, the server 120 can determine a current arrangement, position, and/or orientation of motorized structures.

To identify available structures, the XR application 106 can query the server 120 to obtain information about the motorized structures that are available for use in the space 101. In some examples, the application can subscribe to continue to receive information about the motorized structures when the information is updated. For example, the chair 104 may be removed from the space 101 and the server 120 may push an update that indicates the same to application. Based on tracking the movement and/or location of the chair 104 the server 120 can determine that the chair 104 is no longer available to the XR application 106. The server 120 can update stored information about available motorized structures. The server 120 can also share the updated information with the XR application 106. For example, the server 120 may allow the application to access the stored information.

The motorized structures can be enrolled with the server 120 and/or the XR application 106 based on user input. For example, the user 110 can introduce the chair 104 to the space 101 and register the chair 104 with the XR application 106. In some examples, the user 110 can register the chair 104 with the XR application 106 using the XR device 140. For example, the user 110 can don the XR device 140 and look in the direction of the chair 104 such that the chair 104 is within the field of view of the XR device 140. The user can select, using the XR device, to register the chair 104 with the XR application 106. In some examples, registration of the chair 104 can include capturing images of the chair 104 from multiple different perspectives using cameras embedded in the XR device.

In some examples, registration of the chair 104 can include wired or wireless communication between the chair 104 and the server 120 or the XR device 140. For example, the chair 104 can include a communication module that communicates capability information of the chair 104 to the server 120. In some examples, registration of the chair 104 can include scanning a code of the chair 104. For example, the chair 104 can be labeled with a code, e.g., serial number or bar code. When the user 110 looks at the code through the XR device 140, cameras of the XR device 140 can capture an image of the code and transmit the image to the server 120. The server 120 can use the code to look up and store capabilities of the chair 104.

Information about motorized structures can include data indicating a number of features of each motorized structure. In some examples, the server 120 can store a 3D model of each motorized structure representing 3D characteristics of the motorized structure. The 3D characteristics can include, for example, height, width, and length dimensions of the motorized structures. For example, the 3D characteristics can include a height of the back of the chair, a height of the seat of the chair 104, a maximum and minimum height of the platform 102, a length and width of the platform 102, etc.

In some examples, the server 120 can store data indicating capabilities of the motorized structures. For example, capabilities can include a maximum speed, an acceleration rate, a deceleration rate, a turn radius, etc. The data indicating the capabilities of a motorized structure can include data indicating whether the motorized structures are able to climb stairs or ramps, descent stairs or ramps, change height, change shape, change tilt, rotate in place, etc. The data indicating the capabilities can include data indicating autonomous capabilities of the motorized structure, such as whether the motorized structure is capable of object avoidance, cliff avoidance, autonomously navigating to a target position, etc. The data can also indicate mechanical properties of the motorized structure, e.g., material of construction, weight limit, elasticity, etc. The data can also indicate whether each structure includes retractable components, e.g., a handrail, a retractable shelf, etc. For a motorized structure that includes a retractable component, the data can include a size and shape of the component, of speed of extending and retracting the component, and other data indicating features of the retractable component.

Information about motorized structures can include data indicating a current status of the motorized structure. For example, the data can indicate a current location of the motorized structure, whether the motorized structure is stationary or moving, whether the motorized structure has been assigned to a location, and a current direction and speed of movement of the motorized structure. In some examples, the data can indicate a current position of the motorized structure, e.g., a height, tilt, or orientation of the motorized structure.

In the example of FIG. 1, the server 120 identifies capabilities of the motorized structures in the space 101. For example, the server 120 identifies control options of the platform 102 and the chair 104. The server 120 determines that the platform 102 has capabilities of tilting forward and tilting backward. The platform 102 also has mobility capabilities due to having wheels. The server 120 determines that the chair 104 has capabilities of adjusting height up and adjusting height down. The chair 104 also has mobility capabilities due to having wheels.

The user 110 may view an XR device 140, for example, by wearing an augmented reality headset. Upon activation of the XR device 140, the XR device 140 receives data from embedded cameras and sensors. The XR device 140 may also collect data from other system components.

In stage (B), the server 120 selects structures to support a XR environment 150. The XR environment 150 is an environment generated by the XR application 106 and presented to the user 110 through the XR device 140.

In some examples, the XR application 106 can determine features of the XR environment 150 based at least in part on the available motorized structures in the space 101. For example, the XR application can determine to generate an XR environment of a lakeside scene. The lakeside scene can optionally include a rock 114, a tree 112, and a bench 116. The XR application 106 can determine that the chair 104 is suitable for representing the rock, and that the platform 102 is suitable for representing the tree. The XR application 106 may determine that there is no motorized structure suitable for representing the bench 116. Thus, the XR application 106 can determine to generate the XR environment 150 of the lakeside scene with only the tree and the rock, omitting the bench 116 from the scene.

In another example, the XR application 106 can determine to generate the XR environment 150 including the bench 116, but to present the bench 116 to the user 110 in a way that indicates to the user that no physical object is present at the virtual location of the bench 116. For example, the bench 116 in the XR environment can be color-coded or highlighted to indicate no physical object is present at the bench's virtual location. In another example, if the user 110 approaches the bench 116, the XR device 140 can signal to the user that the user 110 should not attempt to sit on the bench 116, e.g., using haptic, audio, or visual signals.

In another example, the XR application 106 can determine that the rock 114 in the XR environment has a virtual height of two feet, and that the chair 104 has a non-adjustable seat height of eighteen inches. Thus, the XR application 106 can determine that the chair 104 is suitable for representing the rock 114, but that the virtual height of the rock should be adjusted from eighteen inches to two feet in order to match the seat height of the chair 104.

The XR environment includes virtual features including a tree 112, a rock 114, and a bench 116. The server 120 selects the platform 102 to represent the tree 112. The server 120 selects the chair 104 to represent the rock 114. The server 120 does not select any motorized structure to represent the bench 116.

In some examples, the server 120 can identify motorized structures that can create a real-world effect that represents an environmental condition of the XR environment. For example, an XR environment may include a scene in which a user is driving a convertible vehicle. The server 120 can identify a motorized fan that is available to support XR environments. The server 120 can transmit an instruction to the fan that causes the fan to move to a position near the chair 104. The user 110 can sit in the chair 104, which corresponds to a virtual seat in the convertible. When the user 110 accelerates the virtual convertible, the server 120 can send an instruction that activates the motorized fan to blow air in the direction of the user 110, simulating an environmental condition of wind.

The server 120 determines a current position of each selected motorized structure of each selected motorized structure. In some examples, determining a current arrangement of motorized structure may involve accessing position instructions the server 120 last sent to each of the devices (or the devices that the server 120 intends to move). In some examples, the server 120 determines the position and/or orientation of a motorized structure by one or more location sensors (e.g., a global positioning system unit), gyroscopes, and/or accelerometers located on or within the motorized structure. In some examples, the server 120 determines the position and/or orientation of a motorized structure using one or more sensors of the server 120 (e.g., through use of image recognition on camera data from camera 111. In some examples, the server 120 determines the location and/or orientation of a motorized structure based on a combination of the last position instructions it provided to the motorized structure and the data from one or more sensors located on or off the motorized structure.

At stage (C), the server 120 controls structures to support the XR environment 150. The server 120 determines a target position for each motorized structure in the space 101. The server 120 can also determine a path for each motorized structure to move to reach the respective target position. In some examples, the server 120 can determine an order in which the motorized structures should move in order to prevent interference and collision between the motorized structures.

In the example of FIG. 1, the server 120 determines a target position 134 for the chair 104. The server 120 also determines a target tilt amount for the chair 104 and a target orientation of the chair 104. The server 120 determines a path 124 for the chair 104 to follow from its initial position to the target position 134. The server 120 determines a target position 132 for the platform 102. The server 120 also determines a target orientation of the platform 102 and a target height of the platform 102.

The server 120 sends position instructions to the motorized structures, e.g., through the network 109. The position instructions may contain data indicating a final position and/or orientation for a motorized structure. The position instructions may also contain data indicating the path for the motorized structure to take in order to reach its final position and/or orientation. The path may be determined in such a way so that the motorized structure avoids walls, occupants, other moving devices, stationary objects, and/or other obstacles (e.g., pets, Roomba, etc.). The location of walls, occupants, stationary objects, and/or other obstacles may be determined from one or more sensors of the system 100, such as the camera 111.

The position instructions cause the chair 104 to move along the path 124 to the target position 134. The position instructions also cause the chair to rotate to the target orientation and to tilt to the target tilt amount. The position instructions cause the platform 102 to move along the path 122 to the target position 132. The position instructions also cause the platform 102 to rotate to the target orientation and to expand to the target height.

In some examples, the position instructions cause the chair 104 and the platform 102 to move along their respective paths 124, 122 simultaneously. In some examples, the position instructions cause the chair 104 and the platform 102 to move along their respective paths 124, 122 in sequence, e.g., with the platform 102 moving first and the chair 104 moving second.

In some examples, if the server 120 detects that a collision is likely to occur with a motorized structure in the process of moving, the server 120 sends new instructions to the motorized structure. These new instructions may include instructions to stop movement, to pause movement, to follow an updated path, and/or to move back into its previous position and/or orientation. In some examples, the motorized structures can move along the paths according to the position instructions, while performing autonomous obstacle avoidance and collision avoidance.

The motorized structures move into their target positions. In some examples, when a motorized structure arrives at its target positions, the motorized structure can transmit, to the server 120, a report that the motorized structure is in its target position. For example, when the platform 102 arrives at the target position 132 and expands to the target height, the platform 102 can transmit a message to the server 120 through the network 109 that the platform 102 is in the target position. In some examples, when a motorized structure arrives at its target position, the XR device 140 can determine that the motorized structure is in the target position, e.g., based on camera image data captured by embedded cameras of the XR device 140. The XR device 140 can transmit a message to the server 120 indicating that the motorized structure has arrived at the target position. If the motorized structures execute the instructions commanded by the XR application 106, the motorized structures can report the error condition so that the XR application 106 can adapt the XR environment 150 appropriately.

In stage (D), the server 120 provides the XR environment 150 to the XR device 140. The XR environment 150 can be tuned so that the positions of the virtual features in the XR environment precisely correspond to where the motorized structures are located in the space 101. For example, a final position of the platform 102 might be slightly to the east of the virtual position of the tree 112, e.g., due to an obstruction preventing the platform 102 from exactly reaching the target position 132. Thus, the XR application 106 can adjust the virtual representation of the tree 112 to match the final position of the platform 102 in the space. Thus, if the user 110 reaches out to touch the tree 112 in the XR environment, the user 110 will touch the platform 102.

The XR environment 150 can depict virtual objects in a way that indicates to the user 110 whether each virtual object has a real-world representation. For example, the XR environment 150 may depict the tree 112 and the rock 114 with a solid outline or a solid shading, indicating that the tree 112 and the rock 114 have real-world representations of the platform 102 and the chair 104. In contrast, the XR environment 150 can depict the bench 116 with a dashed outline or a translucent shading, indicating that the bench 116 does not have a real-world representation. Other visual, audio, and or haptic cues can be used to signify to the user whether a virtual object has a real-world representation. For example, virtual objects can be depicted as blinking, flashing, and/or having various brightness. In some examples, when the user 110 approaches a virtual object that does not have a corresponding real-world representation, the XR device 140 can generate an audible beep, buzz, or siren, or can generate a vibrational warning to the user 110.

In some examples, the server 120 may provide the XR environment 150 to the user 110 before the motorized structures have arrived at their target positions, and can generate warnings accordingly. For example, the user 110 may approach the rock 114 before the chair 104 has arrived at the target position 134. When the user 110 approaches within a threshold range to the rock 114, the XR device 140 can generate an audible, visible, or haptic warning to signal to the user 110 that the rock 114 does not yet have a real-world representation. In some examples, the XR environment 150 can depict the rock 114 as not having a real-world representation until the chair 104 arrives at the target position 134. For example, the XR environment 150 can initially depict the rock 114 as translucent, while the chair 104 moves along the path 124. When the chair 104 arrives at the target position 134, the XR environment 150 can depict the rock 114 in solid shading.

In some examples, the XR environment 150 can include a distraction for the user 110 while the motorized structures move to their target positions. For example, the XR environment 150 can virtually confine the user 110 to a subsection of the space 101 while the motorized structures move along their paths 124, 122. The XR environment 150 can virtually confine the user 110, e.g., by depicting virtual boundaries that prevent the user 110 from approaching the rock 114 or the tree 112 until the chair 104 and the platform 102 are in the target positions 134, 132. In some examples, the XR environment 150 can virtually confine the user 110 by fading the virtual environment to black. In some examples, the XR environment 150 can display a notification for the user, indicating that the user 110 should remain in place until the motorized structures are in their target positions.

When the motorized structures are in their target positions, and the XR environment 150 is presented to the user 110, the user 110 may interact with the motorized structures. For example, the user 110 can sit on the rock 114 in the virtual environment. The chair 104 acts as the real-world representation of the rock 114, such that when the user 110 sits on the rock 114 in the virtual environment, the user 110 sits on the chair 104 in the space 101.

In some examples, when the user 110 sits on the chair 104, pressure sensors in the chair 104 detect the weight of the user 110. The chair 104 can transmit a message to the server 120, indicating that the user 110 is sitting on the chair 104. The server 120 can then immobilize the chair 104, e.g., by preventing any position instructions from being transmitted to the chair 104 while the user 110 is sitting on the chair 104.

In some examples, motorized structures can include various sensors, e.g., capacitive sensors, radar sensors, lidar sensors, acoustic sensors, etc. The sensors can enable the motorized structures to determine a location of the user 110 in relation to the motorized structures. For example, based on capacitive sensor data, a motorized structure can determine whether the user 110 is touching the motorized structure. In another example, based on radar sensor data, a motorized structure can determine a distance of the user from the motorized structure. In some examples, a motorized structure can include force sensors to measure a direction and/or strength of force applied to the motorized structure by the user. For example, force sensors included in the platform 102 can detect when the user 110 leans against the platform 102. In some examples, the motorized structures can detect an applied force based on feedback from wheel motors of the motorized structures.

In some examples, the server 120 can immobilize a motorized structure, such as the chair 104, when sensor data indicates that the user is touching the chair 104, is applying a force to the chair 104, and/or is within a threshold proximity to the chair 104.

In some examples, when the user 110 sits on the chair 104, the server 120 can determine that the user 110 is sitting on the chair 104 based on camera image data captured by embedded cameras of the XR device 140 or by the camera 111. Similarly, the server 120 can use camera image data and/or other sensor data to determine when the user 110 is in process of interacting with a motorized structure. For example, the server 120 can determine, based on camera image data, that the user 110 is about to lean against the platform 102. The server 120 can then immobilize the platform 102, e.g., by preventing any position instructions from being transmitted to the platform 102 while the user 110 is interacting with the platform 102. In some examples, the server 120 can immobilize the platform 102 by activating a braking system that prevents wheels of the platform 102 from rolling.

In some examples, the user's body, particularly feet, knees, and/or hips, can be actively tracked to better track and predict user motion. The XR device 140 can warn the user 110 if they are about to put weight onto a virtual object that had no real-world representation, or if they are about to trip over a motorized structure that has not yet moved out of the user's way.

In some examples, motorized structures can be used dynamically to give the impression of more objects than are actually present in the space 101. For example, the XR environment 150 includes the rock 114 and the bench 116. The server 120 may determine that the chair 104 is suitable for representing both the rock 114 and the bench 116. The server 120 can track movement of the user 110 to predict whether the user 110 is going to interact with the rock 114 or with the bench 116. If the server 120 determines that the user 110 is going to interact with the rock 114, the server 120 can instruct the chair 104 to move to the target position 134. If the server 120 determines that the user 110 is going to interact with the bench 116, the server 120 can instruct the chair 104 to move to a target position that corresponds to the virtual position of the bench 116. Thus, the chair 104 can represent two different virtual features of the XR environment 150.

In some examples, the XR application can use learned models of the user's typical and/or maximum rates of movement in various situations, and adjust the XR environment appropriately. For example, if the XR application 106 determines that the user 110 is likely to interact with the bench 116 and the tree 112, but not the rock 114, the XR application 106 can use the motorized structures to represent the bench 116 and the tree 112. The XR application can omit the rock 114, or can depict the rock 114 in a way that signals to the user 110 that there is no real-world representation of the rock 114.

When the XR application 106 ends the scene depicted in the XR environment 150, the server 120 can send instructions to the chair 104 and to the platform 102 to move to new target positions in order to support the next XR environment. In some examples, when the XR application 106 ends the scene, the server 120 can send instructions to the chair 104 and to the platform 102 that cause the chair 104 and the platform 102 to move to their respective parking spaces in or near the space 101.

Figure 2:
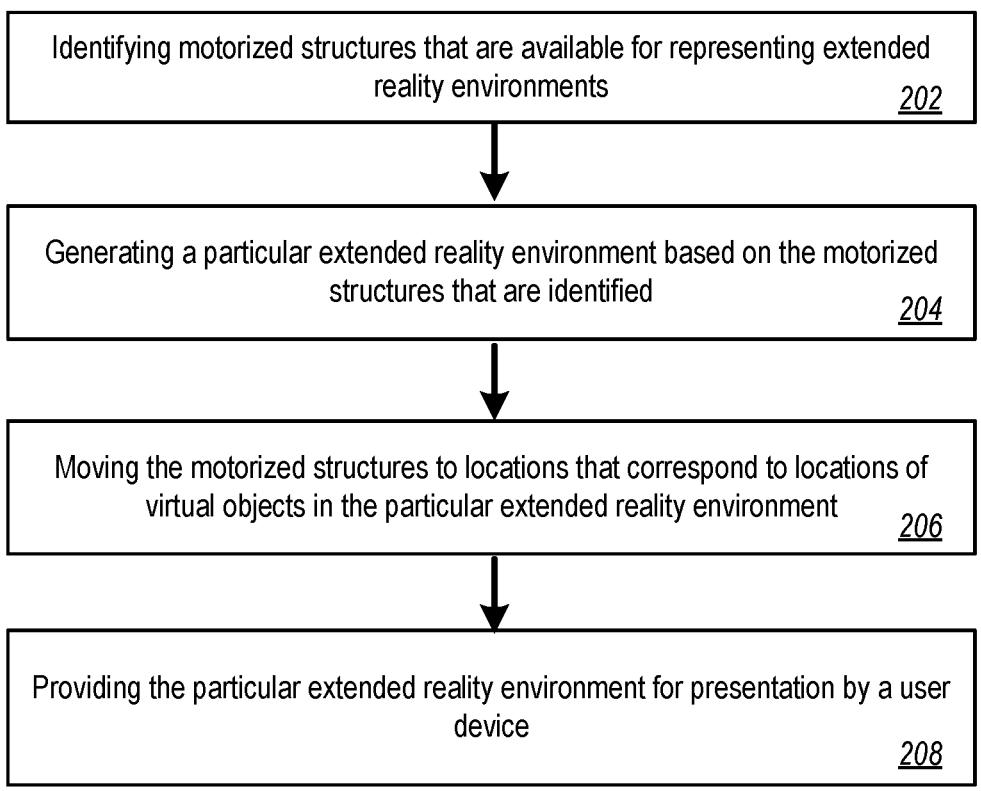
FIG. 2 is a flow diagram of a process for controlling motorized structures to support XR environments.

FIG. 2 illustrates an example process 200 for controlling motorized structures to support XR environments. The process 200 can be performed by one or more computing devices, for example, the server 120 or the XR device 140.

The process 200 includes identifying motorized structures that are available for representing XR environments (202). For example, the server 120 can identify the chair 104 and the platform 102 as being available for representing XR environments.

The process 200 includes generating a particular XR environment based on the motorized structures that are identified (204). For example, the XR application 106 running on the server 120 can generate the XR environment 150 based on identifying the chair 104 and the platform 102. The XR environment 150 includes a virtual rock 114 and a virtual tree 112.

The process 200 includes moving the motorized structures to locations that correspond to locations of virtual objects in the particular XR environment (206). For example, the server 120 can transmit instructions that cause the chair 104 to move to the target position 134 in the space 101 that corresponds to the location of the virtual rock 114 in the XR environment 150. The server 120 can transmit instructions that cause the platform 102 to move to the target position 132 in the space 101 that corresponds to the location of the virtual tree 112.

The process 200 includes providing the particular XR environment for presentation by a user device (208). For example, the XR application 106 running on the server can provide the XR environment 150 for presentation by the XR device 140.

Figure 3:
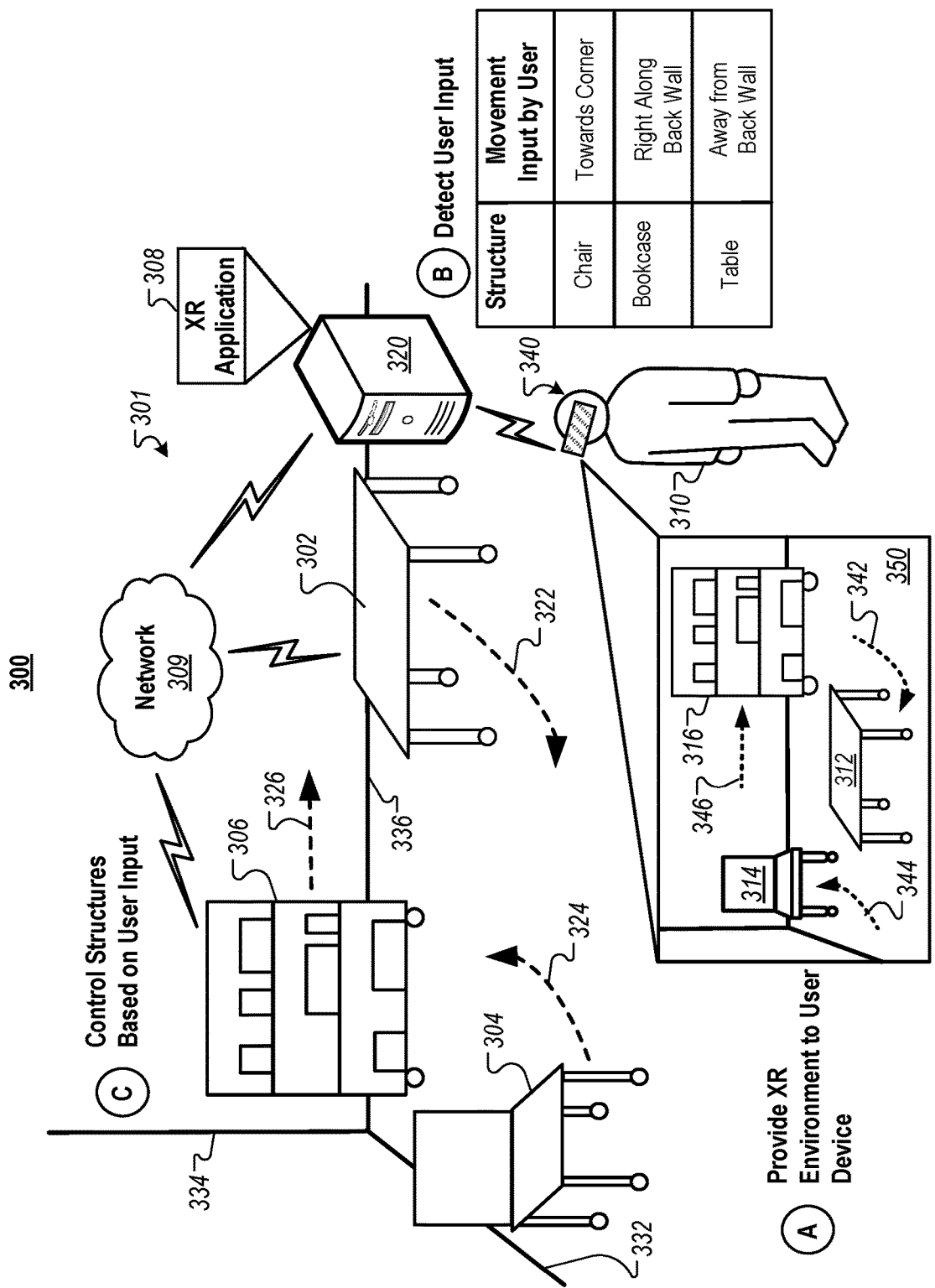
FIG. 3 is a diagram illustrating an example of a motorized structure control system that controls motorized structures based on user input received through an XR system.

FIG. 3 is a diagram illustrating an example of a motorized structure control system that controls motorized structures based on user input received through an XR system. In FIG. 3, a space 101 is equipped with the motorized structure control system 300 that includes various motorized structures, e.g., table 302, chair 304, and bookcase 306. The system 300 also includes a network 309, a server 320, and an XR device 340. The server 320 runs an XR application 308. XR environments generated by the XR application 308 are provided to the XR device 140 for presentation to a user 310.

In the example of FIG. 3, the XR system includes the XR device 340 and the server 320. The XR device 340 includes a headset worn by the user 310. The XR system can also include one or more controllers and/or trackers that are worn by or carried by the user 310.

In some examples, an XR system can include a wearable computing system that performs the functions of the server 320. For example, the computing system can be integrated with the headset. In some examples, the XR system includes a headset and a separate wearable computing system that performs the functions of the server 320. For example, the XR system can include a wearable computing system that is integrated with a backpack, vest, harness, etc.

The space 301 can be any space in which a user 310 uses an XR system. For example, the space 301 can be a room of a building or an outdoor area. The space 301 can be a mostly empty space where the user 310 can freely move about without tripping over hazards or bumping into objects in the real world.

Components of the system 300 can communicate through a network 309. The network 309 may be any communication infrastructure that supports the electronic exchange of data between the device sand the sensors. The network 309 may include a local area network (LAN), a wide area network (WAN), the Internet, or other network topology. To support communications through the network 309, the components, e.g., the XR device 340, the server 320, and the motorized structure, may include communications modules, such as a modem, transceiver, modulator, or other hardware or software configured to enable the device to communicate electronic data through the network 305.

The server 320 may be located within or outside of the space 301. The server 320 is in communication with the XR device 340. The server 320 may be, for instance, one or more computer systems, server systems, or other computing devices. In some examples, the server 320 may be a cloud computing platform. The server 320 can store a model of the space 301. For example, the server 320 can store data indicating boundaries of the space 101. Boundaries of the space 101 can be physical boundaries, e.g., walls, or can be virtual boundaries input by the user 310.

The server 320 tracks the location and movement of the motorized structures. For example, the server 320 tracks the location and movement of the table 302, the chair 304, and the bookcase 306 throughout the space 301. In some examples, the server 320 can track motorized structures using inside-out tracking based on sensors installed on the motorized structures. For example, the table 302, the chair 304, and the bookcase 306 may have embedded sensors, e.g., inertial measurement units, accelerometers, gyroscopes, electromagnetic sensors, etc. The server 320 can use sensor data generated by the sensors to determine location, speed, and direction of motion of the motorized structures. The sensors can provide sensor data to the server 320 through the network. Based on the sensor data, the server 320 can track movement of the components. Similar to the server 120, the server 320 can track location and movement of the motorized structures using a combination of inside-out and outside-in tracking.

The server 320 can run an XR reality or virtual reality application such as a game. The server 320 can generate an XR environment for presentation to the user 310 as an XR image displayed through the XR device 340. The XR image can be displayed on a wide variety of displays, or directly into the user's eyes, usually through glasses or a headset. Other XR devices include smartphones and tablets. The user 310 can hold these types of devices in their hands and view the display of the smartphone or tablet.

The motorized structures can be located in or near the space 301 in order to support XR environments presented to the user 310 through the XR device 340. The motorized structures can be maneuverable about the space 301. For example, the motorized structures can include wheels, legs, skis, stair-climbers, treads, and/or other components that permit the motorized structures to move. The motorized structures can include motors, e.g., electric motors. The motors can be battery powered and/or rechargeable.

The motorized structures include the table 302, the chair 304, and the bookcase 306. In some examples, the motorized structures might not include sensors. For example, the motorized structures can be remotely controlled by the server 320 without having autonomous capabilities. In some examples, the motorized structures can include onboard sensors and/or processing capabilities. The sensors and processing capabilities can enable the motorized structures to perform autonomous navigation around the space 301.

In stage (A), the server 320 provides an XR environment 350 to the XR device 340. The XR environment includes virtual structures including a virtual chair 314, and virtual table 312, and a virtual bookcase 316. The virtual structures can be depicted in a virtual or augmented representation of the space 301.

In some examples, the XR environment 350 depicts the virtual structures in virtual locations that correspond to the real-world locations of the corresponding motorized structures. For example, the XR environment 350 can initially depict the virtual chair 314 in a position along a left wall 332 of the space 301. The XR environment 350 can initially depict the virtual table 312 along a back wall 336 of the space 301, and can initially depict the virtual bookcase 316 in a corner 334 of the space 301.

In stage (B), the server 120 detects user input to the XR device 340. For example, the user can provide input to the XR device 340 indicating desired movement of the motorized structures.

In some examples, the user 310 can provide input to the XR device 340 using one or more controllers such as hand-held controllers. For example, the user 310 can use a controller to select one of the virtual structures, e.g., the virtual chair 314. The user 310 can then use the controller to indicate movement of the chair 314 from the initial position along the left wall 332 to a second position in the corner 334. In some examples, the user 310 can indicate desired movement using eye movement, hand gestures, or other gestures or movements that are recognizable by the XR device 340.

In the example of FIG. 3, the user provides input to the XR device 340 indicating desired movement of the virtual chair 314 towards the corner 334, desired movement of the virtual bookcase 316 to the right along the back wall 336, and desired movement of the virtual table 312 away from the back wall 336.

In some examples, the XR application 308 can adjust positions of the virtual structures as the user 310 interacts with the virtual structures. For example, the user 310 may "grab" the virtual chair 314 and "drag" the virtual chair 314 along path 344 from the initial position along the left wall 332 to the second position in the corner 334. As the user drags the virtual chair 314, the XR application 308 can update the XR environment 350 to show the virtual chair 314 moving along the path 344. Similarly, the XR application can update the XR environment to show motion of the virtual table 312 along path 342, and of the virtual bookcase 316 along path 346.

By moving virtual structures around the XR environment 350, the user 310 can preview various arrangements of structures in the space 301. For example, the user 310 may be considering rearranging furniture in the space 301. The user 310 can manipulate virtual furniture in the XR environment 350 to view various different arrangements without having to physically move the furniture. Thus, the XR environment 350 can assist the user 310 in choosing an arrangement for the furniture in the real world.

In some examples, the server 320 can store virtual models of the motorized structures that accurately represent shapes and sizes of the structures. If the user 310 tries to move a virtual structure to a location in the XR environment where the corresponding real-world feature would not fit, the XR application can perform one or more actions to indicate to the user 310 that the selected feature cannot be moved to the desired location. For example, the XR application can generate a warning for the user 310, e.g., by flashing lights, by color-coding or highlighting the structure, and/or by refusing to move the virtual structure to the location indicated by the user 310.

In some examples, the XR application can provide the user with an option of moving the virtual structures first, before executing any movement in the real world. For example, the XR device 340 can display a selectable option such as a "submit" button. When the user 310 selects the "submit" button, the server 320 can commence sending instructions to the motorized structures to move to the locations input by the user 310. In some examples, the user 310 can provide a verbal command, e.g., "move furniture,"

to the XR device 340. In response to the verbal command, the server 320 can commence sending instructions to the motorized structures to move to the locations input by the user 310.

In some examples, the user 310 can use the XR device 340 to generate multiple furniture arrangements and assign the furniture arrangements to different "scenes." The server 320 can then trigger movement of the furniture when a scene is changed. The scene can be changed, e.g., in response to user input, based on a schedule, or in response to a detected condition or event. In an example, the user 310 can generate a first furniture arrangement using the XR device 340, and assign the first furniture arrangement to a "weekday" scene. The user 310 can generate a second furniture arrangement using the XR device 340, and assign the second furniture arrangement to a "weekend" scene. On Friday afternoon, based on a programmed schedule, the server 320 can send instructions to the motorized structures to move from positions associated with the first furniture arrangement to positions associated with the second furniture arrangement.

In stage (C) the server 320 controls structures based on user input. The server 320 determines a target position for each motorized structure in the space 301. The target position is a target position in the space 301 that corresponds to the location input by the user 310. For example, the target position of the chair 304 is the corner 334.

The server 320 can also determine a path for each motorized structure to move to reach the respective target position. The paths may correspond to the paths input by the user 310. For example, the path 324 of the chair 304 in the space 301 corresponds to the path 344 of the virtual chair 314 in the XR environment 350. Similarly, the path 326 of the bookcase 306 in the space 301 corresponds to the path 346 of the virtual bookcase 316 in the XR environment 350 and the path 322 of the table 302 in the space 301 corresponds to the path 342 of the virtual table 312 in the XR environment 350.

In some examples, the server 120 may determine that the paths input by the user 310 are not feasible in the space 301. For example, the server 120 may store a model of the space 301 that indicates that an obstacle is located along the path 322. The obstacle may be, for example, a motorized or non-motorized piece of furniture. Thus, the server 120 can determine a path for the table 302 to move to its target position that is different from the path 322, in order to avoid the obstacle. The paths may be determined in such a way so that the motorized structures avoid walls, occupants, other moving devices, stationary objects, and/or other obstacles.

In some examples, the server 320 can determine an order in which the motorized structures should move in order to prevent interference and collision between the motorized structures. For example, the server 120 may determine that the bookcase 306 needs to move away from the corner 334 before the chair 304 moves into the corner. The server 120 may also determine that the table 302 needs to move away from the back wall 336 before the bookcase 306 moves to the right along the back wall 336. The server 120 can therefore determine that the table 302 should move along path 322, or start moving along path 322, before the bookcase 306 starts moving along path 326. In this way, the server 120 can deconflict movement of the multiple motorized structures.

The server 120 can send instructions to each motorized structure. The instructions can indicate, e.g., a target position, a path to traverse, a time to begin movement, a speed of movement, etc. The instructions can also indicate, e.g., a size, shape, orientation, or configuration of the motorized structures.

The position instructions cause the chair 304 to move along the path 324 to the target position. The position instructions also cause the chair 304 to rotate to the target orientation and to tilt to the target tilt amount. The position instructions cause the table 302 to move along the path 322 to the target position. The position instructions also cause the table 302 to rotate to the target orientation and to raise or lower to the target height.

In some examples, if the server 320 detects that a collision is likely to occur with a motorized structure in the process of moving, the server 320 sends new instructions to the motorized structure. These new instructions may include instructions to stop movement, to pause movement, to follow an updated path, and/or to move back into its previous position and/or orientation. In some examples, the motorized structures can move along the paths according to the position instructions, while performing autonomous obstacle avoidance and collision avoidance.

The motorized structures move into their target positions. In some examples, when a motorized structure arrives at its target positions, the motorized structure can transmit, to the server 320, a report that the motorized structure is in its target position. For example, when the table 302 arrives at the target position and expands to the target height, the table 302 can transmit a message to the server 320 through the network 309 that the table 302 is in the target position. In some examples, when a motorized structure arrives at its target position, the XR device 340 can determine that the motorized structure is in the target position, e.g., based on camera image data captured by embedded cameras of the XR device 340. The XR device 340 can transmit a message to the server 320 indicating that the motorized structure has arrived at the target position. If the motorized structures execute the instructions commanded by the XR application 308, the motorized structures can report the error condition so that the XR application 308 can notify the user 310.

Figure 4:
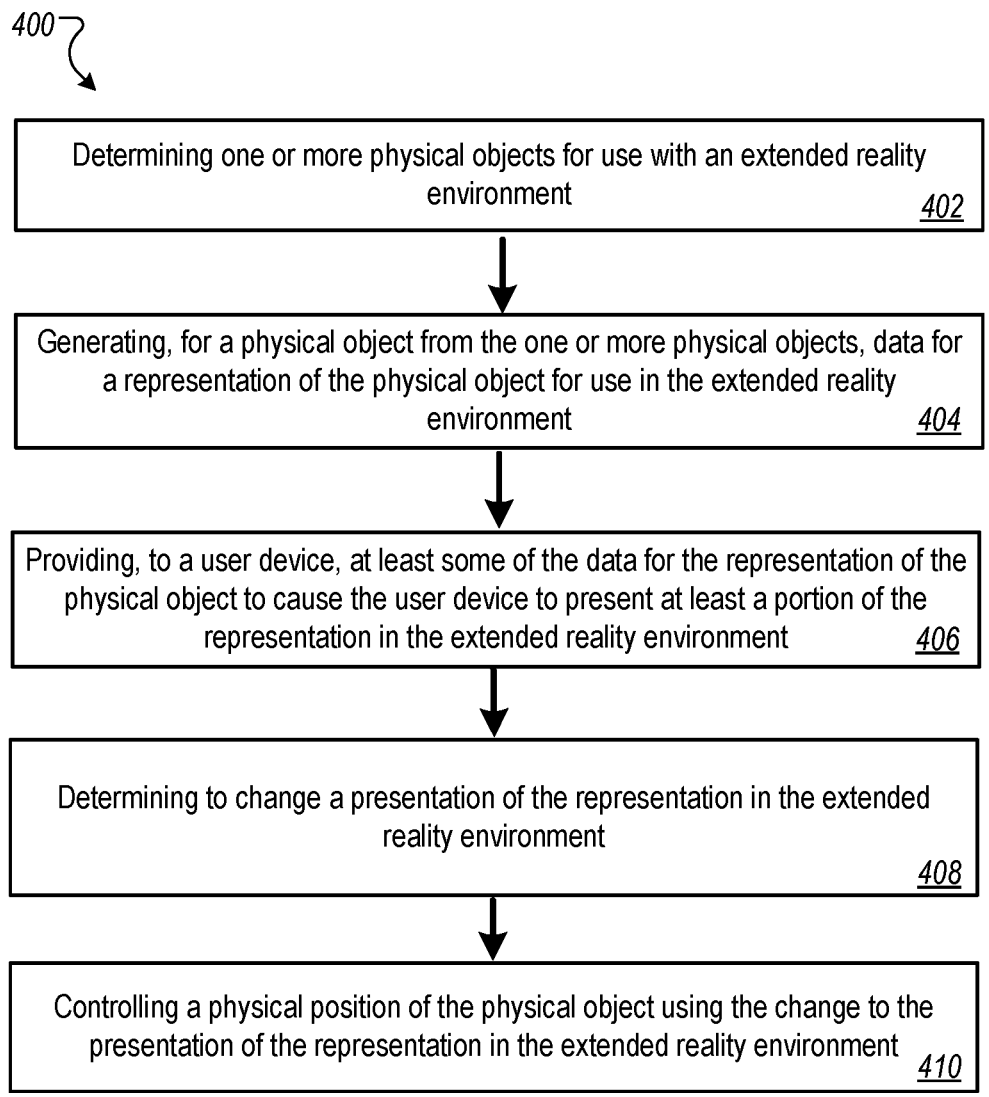
FIG. 4 is a flow diagram of a process for controlling motorized structures based on user input received through an XR system.

FIG. 4 is a flow diagram of a process for controlling motorized structures based on user input received through an XR system. The process 400 will be described as being performed by one or more computing devices, for example, the server 320 or the XR device 340.

The process 400 includes determining one or more physical objects for use with an extended reality environment (402). For example, the server 320 can identify motorized structures including the chair 304, the table 302, and the bookcase 306 as supporting XR environments. The chair 304, the table 302, and the bookcase 306 can be enrolled or registered with the server 320, such that the server 320 stores information about each of the motorized structures. The stored information can include 3D models of the motorized structures.

The process 400 includes generating, for a physical object from the one or more physical objects, data for a representation of the physical object for use in the extended reality environment (404). For example, the XR application 308 running on the server 320 can generate the XR environment 350 including the chair 304, the table 302, and the bookcase 306.

The process 400 includes providing, to a user device, at least some of the data for the representation of the physical object to cause the user device to present at least a portion of the representation in the extended reality environment (406). For example, the server 320 can provide the XR environment 350 for presentation by the XR device 340 to the user 310.

The process 400 includes determining to change a presentation of the representation in the extended reality environment (408). For example, the server 120 can receive, through the XR device 340, data indicating input by the user 310. The input can include an adjustment to at least one of the chair 304, the table 302, or the bookcase 306. The adjustment can include movement of a structure to a new position in the space 301, removal of the structure from the space, and/or adjustment of a size, shape, or orientation of the structure.

The process 400 includes controlling a physical position of the physical object using the change to the presentation of the representation in the extended reality environment (410). The process 400 can perform this operation in response to determining to change the presentation of the representation. For example, the server 320 can control that at least one of the chair 304, the table 302, or the bookcase 306 based on the input by the user 310. The server 320 can transmit instructions to the motorized structures over the network 309. The instructions can cause the structures to move to the new position input by the user 310.

The order of steps in the process 400 described above is illustrative only, and the control of motorized structures based on user input received through an XR system can be performed in different orders. For example, the generating an extended reality environment including sets of structures (404) can be performed before identifying structures that support extended reality environments (402).

In some implementations, the process 400 can include additional steps, fewer steps, or some of the steps can be divided into multiple steps. For example, the generating an extended reality environment including the set of structures (404) can be performed without including the set of structures. In some examples, the process 400 can include steps 404 to 410 without step 402.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device.

Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

The invention claimed is:

1. A computer-implemented method comprising:
maintaining a database of types of extended reality objects and corresponding feature sets compatible for use with extended reality environments;
detecting one or more physical objects, for use with an extended reality environment;
determining, for each of the one or more physical objects and using the database of types of extended reality objects and corresponding feature sets compatible for use with extended reality environments, a corresponding feature set for the corresponding physical object, wherein at least one physical object has a different feature set than another physical object;
determining one or more candidate virtual objects for presentation in the extended reality environment;
determining, for each of the one or more candidate virtual objects, corresponding virtual feature sets;
determining whether a corresponding feature set for a physical object from the one or more physical objects satisfies a similarity criterion for a virtual feature set for a virtual object from the one or more candidate virtual objects;
determining whether to select the virtual object using a result of the determination whether the corresponding feature set for a physical object from the one or more physical objects satisfies the similarity criterion for a virtual feature set for the virtual object from the one or more candidate virtual objects;
selecting one or more virtual objects for presentation in the extended reality environment using the feature sets of the one or more physical objects;
generating, for each of the one or more physical objects and using the corresponding feature set and data for the one or more virtual objects, data for a representation of the physical object for use in the extended reality environment;
providing, to a user device, at least some of the data for the representation of the physical object to cause the user device to present at least a portion of the representation in the extended reality environment;
determining to change a presentation of the representation in the extended reality environment; and
in response to determining to change the presentation of the representation, controlling a physical position of the physical object using the change to the presentation of the representation in the extended reality environment.

2. The method of claim 1, comprising generating the extended reality environment that includes the representation of the physical object.

3. The method of claim 1, wherein:
- detecting the one or more physical objects comprises determining whether a motorized object is available for representing objects in the extended reality environment; and
- controlling the physical position of the physical object comprises sending, to the motorized object, instructions to cause the motorized object to move to a physical location that corresponds to a virtual location of the representation in the extended reality environment in response to determining that the motorized object is available for representing objects in the extended reality environment.

4. The method of claim 1, wherein generating the data for the representation comprises generating a first representation i) of a first physical object from the one or more physical objects ii) that has the same type as the first physical object.

5. The method of claim 1, wherein generating the data for the representation comprises generating a first representation i) of a first physical object from the one or more physical objects ii) that has a different type than the first physical object.

6. The method of claim 1, wherein determining to change the presentation of the representation comprises receiving, through the user device, data indicating a user-input adjustment to the representation in the extended reality environment.

7. The method of claim 1, comprising changing the presentation of the representation in the extended reality environment substantially concurrently with controlling the physical position of the physical object that corresponds to the representation.

8. A system comprising one or more computers and one or more storage devices on which are stored instructions that are operable, when executed by the one or more computers, to cause the one or more computers to perform operations comprising:
- detecting one or more physical objects for use with an extended reality environment;
- determining, for each of the one or more physical objects, a corresponding feature set;
- selecting one or more virtual objects for presentation in the extended reality environment using the feature sets of the one or more physical objects, the selecting comprising:
  - determining one or more candidate virtual objects for presentation in the extended reality environment;
  - determining, for each of the one or more candidate virtual objects, corresponding virtual feature sets;
  - determining whether a corresponding feature set for a physical object from the one or more physical objects satisfies a similarity criterion for a virtual feature set for a virtual object from the one or more candidate virtual objects; and
  - determining whether to select the virtual object using a result of the determination whether the corresponding feature set for a physical object from the one or more physical objects satisfies the similarity criterion for a virtual feature set for the virtual object from the one or more candidate virtual objects;
- generating, for each of the one or more physical objects and using the corresponding feature set and data for the one or more virtual objects, data for a representation of the physical object for use in the extended reality environment;
- providing, to a user device, at least some of the data for the representation of the physical object to cause the user device to present at least a portion of the representation in the extended reality environment;
- determining to change a presentation of the representation in the extended reality environment; and
- in response to determining to change the presentation of the representation, controlling a physical position of the physical object using the change to the presentation of the representation in the extended reality environment.

9. The system of claim 8, the operations comprising generating the extended reality environment that includes the representation of the physical object.

10. The system of claim 8, wherein:
- detecting the one or more physical objects comprises determining whether a motorized object is available for representing objects in the extended reality environment; and
- controlling the physical position of the physical object comprises, sending, to the motorized object, instructions to cause the motorized object to move to a physical location that corresponds to a virtual location of the representation in the extended reality environment in response to determining that the motorized object is available for representing objects in the extended reality environment.

11. The system of claim 8, wherein generating the data for the representation comprises generating a first representation i) of a first physical object from the one or more physical objects ii) that has the same type as the first physical object.

12. The system of claim 8, wherein generating the data for the representation comprises generating a first representation i) of a first physical object from the one or more physical objects ii) that has a different type than the first physical object.

13. The system of claim 8, wherein determining to change the presentation of the representation comprises receiving, through the user device, data indicating a user-input adjustment to the representation in the extended reality environment.

14. The system of claim 8, the operations comprising changing the presentation of the representation in the extended reality environment substantially concurrently with controlling the physical position of the physical object that corresponds to the representation.

15. A non-transitory computer storage medium encoded with instructions that, when executed by one or more computers, cause the one or more computers to perform operations comprising:
- detecting one or more physical objects for use with an extended reality environment having a first extended reality scenario;
- determining, for each of the one or more physical objects, a corresponding feature set;
- determining, using the feature sets of the one or more physical objects, that none of the feature sets include a feature required for presentation of the first extended reality scenario;
- altering the first extended reality scenario to a second extended reality scenario using the feature sets for the determined one or more physical objects and in response to determining that none of the feature sets include a feature required for presentation of the first extended reality scenario;
- selecting one or more virtual objects for presentation in the second extended reality scenario for the extended reality environment using the feature sets of the one or more physical objects;

generating, for each of the one or more physical objects and using the corresponding feature set and data for the one or more virtual objects, data for a representation of the physical object for use in the extended reality environment;

providing, to a user device, at least some of the data for the representation of the physical object to cause the user device to present at least a portion of the representation in the extended reality environment;

determining to change a presentation of the representation in the extended reality environment; and in response to determining to change the presentation of the representation, controlling a physical position of the physical object using the change to the presentation of the representation in the extended reality environment.

16. The method of claim 1, wherein the corresponding features set for the one or more physical objects includes one or more a tilt ability, a movement ability, a maximum speed, or an acceleration rate.

17. The system of claim 8, wherein the corresponding features set for the one or more physical objects includes one or more a tilt ability, a movement ability, a maximum speed, or an acceleration rate.

18. The computer storage medium of claim 15, wherein the corresponding features set for the one or more physical objects includes one or more a tilt ability, a movement ability, a maximum speed, or an acceleration rate.

19. The method of claim 1, wherein:
detecting the one or more physical objects comprises determining whether a motorized object is available for representing objects in the extended reality environment and to skip changing the presentation of the representation of the extended reality environment; and controlling the physical position of the physical object comprises sending, to the motorized object, instructions to cause the motorized object to move to a physical location that corresponds to a virtual location of the representation in the extended reality environment in response to determining that the motorized object is available for representing objects in the extended reality environment and to skip changing the presentation of the representation of the extended reality environment.

20. The computer storage medium of claim 15, wherein generating the data for the representation comprises generating a first representation i) of a first physical object from the one or more physical objects ii) that has a different type than the first physical object.

* * * * *